United States Patent [19]

Takekoshi et al.

[11] Patent Number: 4,716,216
[45] Date of Patent: Dec. 29, 1987

[54] CRYSTALLINE POLYIMIDES CONTAINING CUMULATIVE PHENYLENE SULFIDE UNITS

[75] Inventors: Tohru Takekoshi, Scotia; Patricia P. Anderson, Albany, both of N.Y.

[73] Assignee: General Electric Company, Schenectady, N.Y.

[21] Appl. No.: 932,802

[22] Filed: Nov. 19, 1986

Related U.S. Application Data

[63] Continuation-in-part of Ser. No. 771,096, Aug. 30, 1985, abandoned.

[51] Int. Cl.$^4$ .................... C08G 69/42; C08G 75/00; C08G 79/02
[52] U.S. Cl. ............................ 528/352; 528/125; 528/126; 528/128; 528/173; 528/188; 528/220; 528/225; 528/229; 528/353
[58] Field of Search ............. 528/125, 126, 128, 173, 528/188, 220, 225, 229, 352, 353

[56] References Cited

U.S. PATENT DOCUMENTS

| | | | |
|---|---|---|---|
| 4,017,555 | 4/1977 | Alvarez | 525/437 |
| 4,092,297 | 5/1978 | Williams, III | 528/352 |
| 4,197,397 | 4/1980 | D'Alelio | 528/352 |
| 4,405,770 | 9/1983 | Schoenberg et al. | 528/352 |
| 4,535,115 | 8/1985 | Bakshi et al. | 528/353 X |
| 4,550,156 | 10/1985 | Gallagher | 528/185 |
| 4,576,857 | 3/1986 | Gannett et al. | 428/260 |
| 4,599,396 | 7/1986 | Takekoshi et al. | 528/185 |
| 4,634,760 | 1/1987 | Takekoshi et al. | 528/353 |

FOREIGN PATENT DOCUMENTS 0163518  5/1985  European Pat. Off. .

OTHER PUBLICATIONS

N. Adrova et al., *Polyimides,* Progress in Materials Science Series . . . , vol. VII, Technomic Publishing Co., 1970, pp. 16–20; 86–89; 136–144.

T. St. Clair et al., *Crystalline Polyimides Containing 4,4'-Bis(3,4-Dicarboxyphenoxyl)-Diphenyl Sulfide Dianhydride,* Journal of Polymer Science: Polymer Chemistry Edition, vol. 15, 1977, pp. 1529–1533.

*Primary Examiner*—Lucille M. Phynes
*Attorney, Agent, or Firm*—Francis T. Coppa; James C. Davis, Jr.; James Magee, Jr.

[57] ABSTRACT

Crystalline polyimides having low glass transition temperatures and high solvent resistance are obtained by reacting diamino-oligo-phenylene sulfides with aromatic tetracarboxylic acids or their anhydride derivatives. The diamino-oligo-phenylene sulfides can be of varying length and can be reacted with the dianhydride by conventional processes.

6 Claims, No Drawings

CRYSTALLINE POLYIMIDES CONTAINING CUMULATIVE PHENYLENE SULFIDE UNITS

This application is a continuation-in-part of Ser. No. 771,096, filed Aug. 30, 1985 now abandoned.

This invention relates to crystalline polyimides and more particularly, crystalline polyimides which contain cumulative phenylene sulfide units. Polyimides are a known class of high performance polymers characterized by high glass transition temperatures ($T_g$) and high equilibrium melting temperatures ($T_m$). They are typically prepared by reaction of aromatic diamines with aromatic dianhydrides.

Crystalline polymers, such as crystalline polyimides and polyetherimides, are generally known to be more resistant to solvent action than closely related amorphous polymers because of an added molecular interaction associated with crystallization. For example, although common polyetherimides, such as Ultem ® resin, have a high degree of solvent resistance, they are generally non-crystalline polymers and are soluble in relatively common solvents such as chlorinated hydrocarbons, dipolar aprotic solvents and phenolic solvents. Crystalline polymers are generally insoluble in such solvents.

Two factors make it difficult to prepare crystalline polyimides and polyetherimides which are adaptable to commercial production and use. The first is that it is extremely difficult to predict crystallinity from molecular structure. The second is the extremely high equilibrium melting temperatures ($T_m$) of known crystalline polyimides and polyetherimides, such as the $T_m$ of 425° C. for polymers obtained from p-phenylenediamine and the bis[4-(3,4-dicarboxyphenoxy)phenyl]sulfide dianhydride. While polyimides and polyetherimides are quite thermally stable, such stability is generally not extended to temperatures above about 450° C., leaving little or no process window for the crystalline polymers once they are obtained. Therefore, processing and forming polyimides into useful products is nearly impossible due to the high glass transition temperatures and equilibrium melting temperatures. We have disclosed a class of crystalline polyetherimides with moderate equilibrium melting temperatures in copending application Ser. No. 647,286, filed Sept. 4, 1984, now U.S. Pat. No. 4,599,396, issued July 8, 1986.

It is an object of the present invention to provide a class of crystalline polyimides, including thioetherpolyimides, which have moderate equilibrium melting temperatures and high solvent resistance. It is a further object of the present invention to provide crystalline polyimides, including polythioetherimides, having $T_m$ values low enough to permit convenient processing and fabrication. An additional object of the present invention is to provide crystalline polyimide and polythioetherimide polymers having the advantageous properties of commercially available polyetherimides with a further enhancement of solvent resistant properties. Other objects will be obvious from the detailed description herein.

The concept of crystallinity is treated in considerable detail in the *Encyclopedia of Polymer Science and Technology*, Vol. 4, pp. 449–528 (1966). As explained therein, the fact that a polymer is considered crystalline does not mean that the entire polymer is crystallized. Rather it means that there are crystalline domains of substantial size in the polymer mass. For the purposes of this invention, a polymer is considered crystalline if it has an equilibrium melting point, which is defined as the temperature at which the last crystalline material becomes liquid.

The present invention includes crystalline polyimides consisting essentially of structural units of the formula

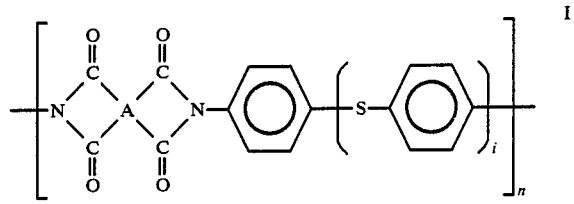

wherein A is a tetravalent aromatic radical of from 6 to 30 carbon atoms, i is a whole number of from 2 to 9 and n is a whole number of at least 5. Included within the scope of the term "polyimides" as used herein are the thioetherpolyimides, also referred to as polythioetherimides.

The tetravalent aromatic radical A is preferably selected from the class consisting of

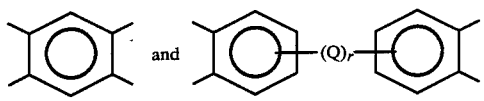

wherein r is equal to 0 or 1 and Q is selected from the group of divalent radicals consisting of —$C_yH_{2y}$—, —$C_yF_{2y}$—,

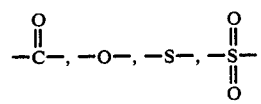

and —O—Z—O—, where y is a whole number of from 1 to 5 and Z is a divalent aromatic radical of from 6 to 17 carbon atoms. The preferred species for the divalent aromatic radical Z are

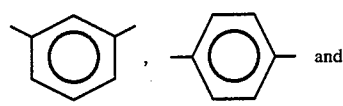

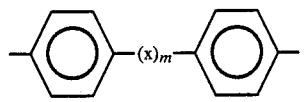

wherein m is equal to 0 or 1 and x is a member of the group consisting of —$C_yH_{2y}$—, —$C_yF_{2y}$—, —O—, —S—,

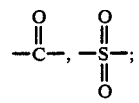

where y is a whole number of from 1 to 5.

The polymers of this invention are preferably at least 80% by weight of the formula I structural units. This ensures crystalline characteristics within these polymers. The remaining portions of these polymers comprise polyimide or polyetherimide structures which are known to the art. Those structures which are associated with either amorphous or crystalline polyimide polymers are suitable. Those polymers which comprise about 100% by weight of the formula I structural units are most preferred.

The number of structural units of formula I in the polymers of this invention ranges widely. In essence, the length is dependent on the melt viscosity desired. The useful polymers have at least 5 of such structural units and those polymers which approach degrees of polymerization equal to 5 generally have structural units of a high molecular weight, i.e., the value for i is above 5. The values for n typically range from 30 to 1000 and more typically from 30 to 60, with values above 1,000 falling within the scope of this invention.

Although the length of the phenylene sulfide chain within each structural unit can have from three (i=2) to ten (i=9) aromatic rings, values for i within the range of 2 to 6 are preferred with the phenylene sulfide chain length preferably being constant throughout the polymer. As the length of the phenylene sulfide chain increases, the polymer takes on the character of polyphenylene sulfide polymers, with temperature resistance declining. In addition, the diamine precursors having shorter lengths of phenylene sulfide are easier to prepare and therefore, are generally preferred.

The polymers of this invention are generally obtained by reaction of aromatic tetracarboxylic acid, including functional derivatives thereof (e.g., dianhydrides, esters or bisimides), with aromatic diamine.

The diamines utilized contain polyphenylene sulfide units of the formula below with amino groups bonded to each end,

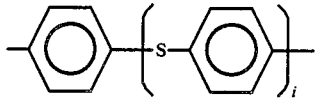

wherein i is as described above. These diamines are characterized as diamino-oligo-phenylene sulfides herein. These diamino-oligo-phenylene sulfides can be prepared by methods known to the art such as those disclosed by Daccord and Sillion in *Polymer Bull.*, Vol. 4, p. 459 (1981). According to this reference, these diamino-oligo-phenylene sulfides are obtained by reacting halogenated aromatic compounds, including bromo derivatives of phenylene sulfides, with aminothiophenol. This reaction takes place in the presence of a basic solution, such as anhydrous potassium carbonate in dipolar aprotic solvents, such as N,N'-dimethylacetamide. Reaction with aminothiophenol provides substitution of the bromine radicals on the brominated aromatic compounds in accordance with equation 1.

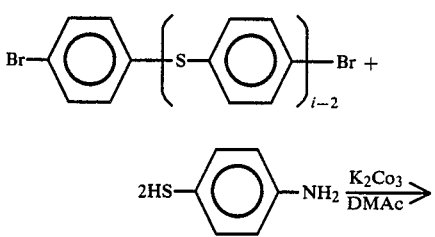

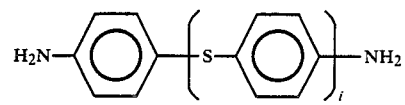

The phenylene sulfide chain is thereby extended while simultaneously incorporating amino functionality on the phenylene sulfide chain. Halogenated aromatic compounds other than those containing bromine are also suitable for reaction with aminothiophenol.

The halogenated aromatic compounds are obtained by methods well known to the art, for example, by reacting aromatic compounds with halogen, e.g., $Br_2$, in solution, such as $CCl_4$. To obtain the phenylene sulfide backbones for bromination, brominated compounds are reacted with thiophenol in the presence of anhydrous potassium carbonate within dipolar aprotic solvents, such as N,N'-dimethylacetamide. Suitable syntheses are described by Koch and Heitz, *Makromol. Chem.*, Vol. 184, p. 779 (1983).

Alternative methods for producing the diamines are also suitable, such as the nucleophilic aromatic substitution reaction of p-chloro-nitrobenzene with the disodium salts of bisthiophenols, followed by reduction of the nitro groups.

Suitable diamines include 1,4-bis(4-aminophenylthio)benzene, (i=2), 4,4'-bis(4-aminophenylthio)diphenylsulfide, (i=3), 1,4-bis[4-(4-aminophenylthio)phenylthio]benzene, (i=4), 4,4'-bis[4-(4-aminophenylthio)phenylthio]diphenylsulfide, (i=5), 1,4-bis[4-(4-{4-aminiophenylthio}phenylthio)phenylthio]benzene (i=6), 4,4'-bis[4-(4-{4-aminophenylthio}phenylthio)phenylthio]-diphenylsulfide, (i=7), 1,4-bis[4-(4-{4-(4-aminophenylthio)phenylthio}phenylthio)-phenylthio]-benzene, (i=8), 4,4'-bis[4-(4-{4-(4-aminophenylthio)phenylthio}-phenylthio)phenylthio]diphenylsulfide, (i=9), etc.

The tetravalent aromatic radical A is incorporated into the polymer via the aromatic tetracarboxylic acid or a functional derivative thereof. Reaction with diamine incorporates the tetravalent aromatic nuclei of these aromatic tetracarboxylic acids and their derivatives. A highly preferred group of tetravalent radicals are obtained from pyromellitic dianhydride; biphenyl-3,3',4,4'-tetracarboxylic dianhydride; 3,3',4,4'-tetracarboxydiphenylsulfide dianhydride; 1,4-bis(3,4-dicarboxyphenoxy)benzene dianhydride; benzophenone-3,3',4,4'-tetracarboxylic dianhydride; and diphenyl ether-3,3',4,4'-tetracarboxylic dianhydride. Applicants have discovered that the reaction of these tetravalent radicals with the diamines discussed above generally results in crystalline polyimides having low equilibrium melting temperatures, as shown in Examples 1-30 below.

Other tetravalent radicals within the scope of A are obtained from common dianhydrides such as:
- 3,3',4,4'-tetracarboxydiphenylpropane dianhydride;
- 3,3',4,4'-tetracarboxydiphenylsulfone dianhydride;
- 1,3-bis(3,4-dicarboxyphenoxy)benzene dianhydride;
- 4,4'-bis(3,4-dicarboxyphenoxy)benzophenone dianhydride;
- 2,2-bis[4-(2,3-dicarboxyphenoxy)phenyl]propane dianhydride;
- 4,4'-bis(2,3-dicarboxyphenoxy)diphenylether dianhydride;

1,3-bis(2,3-dicarboxyphenoxy)benzene dianhydride;
4,4'-bis(2,3-dicarboxyphenoxy)diphenylsulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenylsulfone dianhydride;
4,4'-bis(3,4-dicarboxyphenoxy)diphenylether dianhydride
and 4,4'-bis(3,4-dicarboxyphenoxy)diphenylsulfide dianhydride.

The tetracarboxylic acids and their functional derivatives may be produced by known methods. An example of a suitable process is reaction of an N-substituted 4-nitrophthalimide with the disodium salt of a compound having the formula HO—A'—OH, wherein A' is a divalent aromatic radical of from 6 to about 24 carbon atoms. The resulting bisimide is then converted to a dianhydride. The disclosure of U.S. Pat. No. 3,879,428 is incorporated by reference herein for its description of similar nucleophilic substitution reactions and conversion of the bisimides to dianhydride.

Also included within this invention are the polyamic acid precursors of the polyimides defined by formula I. These polyamic acids are of the formula

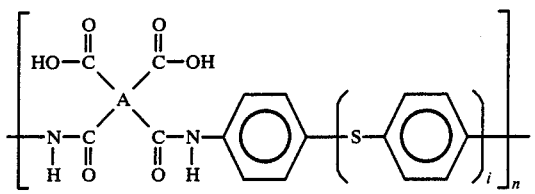

wherein A, i and n are as defined above and the C=O moieties are ortho-positioned so as to form an anhydride when taken together.

Polymerization can be conducted according to known procedures of polyimide preparation. Both solution polymerization and melt polymerization techniques are suitable. Common suitable polymerizations are the high temperature solution methods described in U.S. Pat. No. 3,905,942 and U.S. Pat. No. 3,917,643, incorporated by reference herein and the polyamic acid processes described by Sroog, et al. *J. of Polym. Sci.*, Vol. A3(4), p. 1373 (1965).

To react the dianhydride and diamine by high temperature solution methods, a hydroxyaromatic solvent is often necessary to solubilize the polyimide due to the high temperatures that are necessary. Dipolar aprotic solvents and chlorinated hydrocarbon solvents are also used where solubility is not a problem. A common solvent is m-cresol. Optionally the hydroxyaromatic solvents are used in combination with an aromatic hydrocarbon such as toluene or xylene which facilitates water removal by forming an azeotrope therewith. The reaction solution is typically refluxed for a period of about 1-4 hours at a temperature in the range of about 100° C.-225° C. The reaction mixture may be further dehydrated by recirculating the reflux solvent through a molecular sieve. A portion of this solvent mixture is distilled off and the temperature is permitted to rise to within the range of 125°-225° C. for a period of about 1 hour. The solution is then cooled and diluted, typically with methylene chloride. The polymer precipitates to form a slurry which is recovered and purified by known methods.

The polyamic acid process is a two-stage process in which a polyamic acid is formed in the first stage and the second stage is the imidization or ring closure of this polyamic acid to the imide. The first stage is typically carried out at a temperature within the range of about 0°-100° C., preferably ambient temperature, within a solvent which may be a hydroxyaromatic solvent, but is most often a dipolar aprotic solvent such as dimethylformamide, dimethylacetamide, dimethylsulfoxide or N-methylpyrrolidone or an ether such as diethyleneglycol dimethyl ether. In the second stage, the polyamic acid is converted to the polyimide, typically by heating in the range of about 100°-300° C. upon removal of solvent. This two-stage process finds utility in forming polyimide film or fiber reinforced composites by casting the polyamic acid in solution over a substrate and heating the substrate to remove the solvent and perform the imidization reaction.

Due to the insolubility of the polyimide polymers produced, the polymers may precipitate from solution as they are formed by solution polymerization. Where high molecular weight polymers are desired, the use of the higher temperatures within the ranges given is often necessary to avoid precipitation.

Melt polymerization methods which utilize little or no solvent are also suitable. These polymerization processes are typically performed at temperatures above the $T_g$ values of the polymers and are often performed within the range of about 200°-400° C. within extruders. These processes are more particularly described in U.S. Pat. Nos. 3,989,670 and 4,221,897, incorporated by reference herein.

The molar ratio of diamine to dianhydride is usually between about 0.95-1.05:1 with values of approximately 1:1 being preferred for the formation of high molecular weight polymers. The use of an endcapping agent may be desirable in certain instances in order to avoid an undesirably high melt viscosity. Monofunctional anhydride, such as phthalic anhydride or monofunctional amine, such as aniline, may be used as end-capping agents in a quantity of about 0.2-5.0 mole percent of the difunctional monomer.

It is also possible to prepare the polyimides of this invention by reaction of a phenylene sulfide diamine with a bisimide having an N-substituted electron deficient radical. This process is disclosed in commonly assigned applications Ser. No. 505,636, filed June 20, 1983 now U.S. Pat. No. 4,578,470, issued Mar. 25, 1986, and Ser. No. 647,286, filed Sept. 4, 1984, now U.S. Pat. No. 4,599,396, issued July 8, 1986, which are incorporated by reference herein. The bisimide having an electron-deficient radical is derived from an amine Z'—NH$_2$, which comprises at least 10 mole percent and preferably over 70 mole percent of the free amine constituents within an equilibrated mixture from the reaction represented by the equation below.

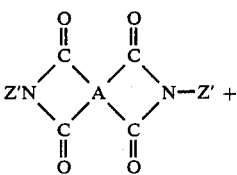

-continued

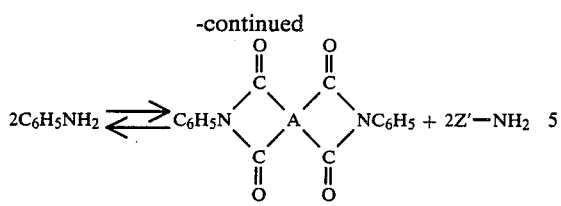

$$2C_6H_5NH_2 \rightleftarrows C_6H_5N \begin{pmatrix} \overset{O}{\underset{\parallel}{C}} & \overset{O}{\underset{\parallel}{C}} \\ A \\ \underset{\parallel}{C} & \underset{\parallel}{C} \\ O & O \end{pmatrix} NC_6H_5 + 2Z'-NH_2$$

wherein A is as defined above.

It is preferred that the amine $Z'-NH_2$ have a boiling point at atmospheric pressure of less than about 300° C. and most preferably less than 180° C. in order that the equilibrium may be easily shifted in favor of polyimide formation during reaction with a diamine.

Included within the scope of Z' are aromatic hydrocarbon radicals such as phenyl, naphyl and the like containing halo, nitro, keto, carbalkoxy, cyano and perfluoroalkyl radicals. Also included within the scope of Z' are five and six-membered heterocyclic radicals having aromatic characteristics such as pyrrolyl, 2-thiazolyl, 2-imidazolyl, 2-(1,3,4-thiadiazolyl), 2-pyridyl, 3-pyridyl, 4-pyridyl, 2-pyrimidyl, 2-pyrazyl, 2-(1,4-thiazolyl) and 2-(1,3-thiazolyl).

Another suitable polymerization scheme is to react the aromatic dianhydrides with the organic diamines in the form of diisocyanates. Details as to this polymerization process are more particularly described in U.S. Pat. No. 3,833,544, incorporated by reference herein.

Each of the groups described by formula (I) will have at least three aromatic rings, with the diamine providing at least two of such rings and the anhydride having at least one aromatic ring. The term "aromatic ring", as used herein, does not include the five-membered heterocyclic ring formed with the tetracarboxylic acid and diamine. The number of aromatic rings can be significantly larger than three where diamines of multiple phenylene sulfide units are used as discussed above.

The polyimides of the present invention will typically have an equilibrium melting point ($T_m$) value below about 450° C. and most often below 400° C. As a general rule, the $T_m$ values fall within the range of about 195°–435° C., with values below 375° C. being preferred.

By reason of their crystallinity, the polyimides of this inventiion are highly resistant to solvent action. The solubility characteristics of these polymers vary significantly. Certain polymers are insoluble in hydroxyaromatic solvents such as m-cresol, dipolar aprotic solvents such as dimethylacetamide, N-methylpyrrolidone and chloroform, while other polymers are soluble in these solvents. In general, these polymers are insoluble in many common solvents for amorphous polyetherimides prepared commercially and are frequently soluble only at elevated temperatures.

The following examples describe particular embodiments of this invention including the preparation of their diamine and dianhydride precursors. It is not intended to limit the scope of this invention to the contents of these examples.

EXAMPLE 1

To 10 milliliters of anhydrous dimethylacetamide were added 1,4-bis(4-aminophenylthio)benzene (1.069 g, 3.295 moles) and diphenylsulfide-3,3',4,4'-tetracarboxylic dianhydride (1.075 g, 3.295 millimoles). The mixture was stirred for 15 hours under nitrogen at room temperature. The resulting clear, viscous solution was cast over a glass plate. This was gradually heated under nitrogen to 290° C. over a period of 7 hours. A tough yellow film was obtained. The $T_m$ equalled 223° C. and the $T_g$ equalled 217° C. The polymer showed partial solubility in dimethylacetamide and N-methylpyrrolidone. The polymer was insoluble in m-cresol and chloroform.

EXAMPLES 2–25

Table I illustrates the melting points for the diamines utilized in these examples. 4.907 millimoles of the diamines and 4.809 millimoles of the dianhydride listed in Table II were mixed with 0.196 moles of phthalic anhydride (a chain capping agent), 10.4 milliliters of m-cresol, and 7 milliliters of toluene. These mixtures were stirred and heated to reflux for 1 hour. The water formed was removed as an azeotrope. The reaction mixture was further dehydrated by recirculating the refluxing toluene through a bed of 4-Angstrom molecular sieves for about 5 hours. The toluene was then distilled off and the temperature allowed to rise to 190° C. over a period of 1 hour. The reaction mixture was cooled and diluted with 20 milliliters of methylene chloride. The polymer precipitated to form a slurry which was diluted with methanol. The precipitated polymer was filtered, washed with methanol and dried under vacuum at a temperature of about 100° C.

A majority of the polymers of Examples 2–25 were insoluble in chloroform and dimethylacetamide. A smaller majority exhibited insolubility in N-methylpyrrolidone and m-cresol. Details as to the solubility for the polymers of Examples 2–25 and their glass transition temperatures and melting temperatures are shown in Table III.

TABLE I

Diamines $$H_2N-\!\!\left\langle\!\!\bigcirc\!\!\right\rangle\!\!-\!\!\left[\!\!-S-\!\!\left\langle\!\!\bigcirc\!\!\right\rangle\!\!-\right]_i\!\!-\!\!NH_2$$

| | mp (°C.) |
|---|---|
| i = 2 | 162–163 |
| i = 3 | 137–139 |
| i = 4 | 171.5–173 |
| i = 5 | 195.5–197.5 |
| i = 6 | 214–217 |

TABLE II

| Examples | Diamines[b] | Dianhydrides[a] |
|---|---|---|
| 2 | i = 2 | SDA |
| 3 | i = 2 | HQDA |
| 4 | i = 2 | BIDA |
| 5 | i = 3 | PMDA |
| 6 | i = 3 | BPDA |
| 7 | i = 3 | BIDA |
| 8 | i = 3 | SDA |
| 9 | i = 3 | HQDA |
| 10 | i = 4 | PMDA |
| 11 | i = 4 | BPDA |
| 12 | i = 4 | BIDA |
| 13 | i = 4 | SDA |
| 14 | i = 4 | HQDA |
| 15 | i = 4 | BPA—DA |
| 16 | i = 5 | PMDA |
| 17 | i = 5 | BPDA |
| 18 | i = 5 | BIDA |
| 19 | i = 5 | HQDA |
| 20 | i = 5 | BPA—DA |
| 21 | i = 6 | PMDA |
| 22 | i = 6 | BPDA |
| 23 | i = 6 | BIDA |

TABLE II-continued

| Examples | Diamines[b] | Dianhydrides[a] |
|---|---|---|
| 24 | i = 6 | SDA |
| 25 | i = 6 | HQDA |

[a]SDA = 3,3',4,4'-tetracarboxydiphenylsulfide dianhydride
HQDA = 1,4-bis-[3,4-dicarboxyphenoxy]benzene
BPDA = benzophenone-3,3',4,4'-tetracarboxylic dianhydride
PMDA = pyromellitic dianhydride
BIDA = biphenyl-3,3',4,4'-tetracarboxylic dianhydride
BPA—DA = Bisphenol-A dianhydride, 2,2-bis[4-(3,4-dicarboxyphenoxy)phenyl]propane dianhydride
[b]Diamines are of the formula:

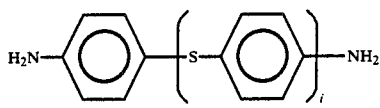

TABLE III

| Ex. | $T_g$ (°C.) | $T_m$ (°C.) | Chloroform | DMAC[b] | NMP[a] | m-cresol | o-chlorophenol |
|---|---|---|---|---|---|---|---|
| 2 | 217 | 223 | i | — | ps | s | s |
| 3 | 208 | 231 | i | — | ps | s | s |
| 4 | 263 | 372 | i | i | i | i | s |
| 5 | 250 | 435 | i | i | i | i | i |
| 6 | 226 | 344 | i | i | i | i | s |
| 7 | 227 | 269 | i | i | ps | s | s |
| 8 | 207 | 207 | i | i | s | s | s |
| 9 | 195 | 217 | i | i | i | s | s |
| 10 | 220 | 391 | i | i | i | i | i |
| 11 | 202 | 322 | i | i | i | i | i |
| 12 | 204 | 220 | i | i | s | s | s |
| 13 | 181 | — | sw | sw | s | s | s |
| 14 | 181 | 193 | i | sw | s | s | s |
| 15 | 174 | — | s | i | s | s | s |
| 16 | 207 | 364 | i | i | i | i | s |
| 17 | 200 | 267 | i | i | i | i | i |
| 18 | 194 | 263 | i | i | i | i | s |
| 19 | 175 | 175 | sw | sw | s | s | s |
| 20 | 163 | — | s | s | s | s | s |
| 21 | 194 | 365 | i | i | i | i | i |
| 22 | 184 | 276 | i | i | i | i | i |
| 23 | 182 | 201 | i | i | s | i | s |
| 24 | 171 | 205 | i | i | sw | i | s |
| 25 | 170 | 188 | sw | i | sw | sw | s | s = soluble,
i = insoluble,
ps = partially soluble,
sw = swelled
[a]N—methylpyrrolidone
[b]dimethyl acetamide Examples 13, 15 and 20 are outside the scope of the present invention because crystallinity was not detected in these particular compositions. The remainder of the compositions exhibited crystallinity, including the other SDA-containing compositions.

EXAMPLES 26-30

Polymers formed from the diamines listed in Table IV and diphenyl ether-3,3',4,4'-tetracarboxylic dianhydride were prepared by mixing 4.907 millimoles of diamine and 4.809 millimoles of the dianhydride along with 0.196 millimoles of phthalic anhydride (a chain capping agent), 10.4 milliliters of m-cresol and 7 milliliters of toluene according to the procedure described in Examples 2-25. The precipitated polymer was filtered, washed with methanol and dried under vacuum at a temperature of about 100° C.

Solubility tests were conducted as in Examples 2-25, using the solvents listed in Table IV.

TABLE IV

| Ex. | Diamine[a] value of i = | $T_g$ (°C.) | $T_m$ (°C.) | $CH_2Cl_2$ | DMAC[b] | NMP[c] | $C_6H_4OHCl$[d] |
|---|---|---|---|---|---|---|---|
| 26 | 2 | 225 | 236 | i | i | i | s |
| 27 | 3 | 211 | — | i | i | sw | s |
| 28 | 4 | 190 | 197 | i | sw | s | s |
| 29 | 5 | 197 | — | i | s | s | s |
| 30 | 6 | 168 | 194 | i | i | s | s |

[a] = Diamines of the formula:

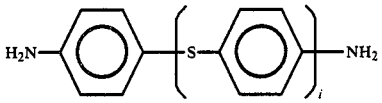

[b] = Dimethyl acetamide
[c] = N—methylpyrrolidone
[d] = ortho-chlorophenol
i = insoluble, s = soluble, sw = swelled The results in Table IV demonstrate that polyimides prepared from diphenyl ether-3,3',4,4'-tetracarboxylic dianhydride and the phenylene sulfide diamines having i values of 2,4, and 6 exhibit crystallinity and have desirably low $T_m$ values. Crystallinity was not apparent for i values of 3 and 5. It is thus apparent that predictions regarding crystallinity on the basis of chemical structure alone are very difficult.

The crystalline polyimides of this invention may be used for films, molding compounds, fiber reinforced composites, coatings and the like. They provide an added degree of solvent resistance over polyetherimides and typically maintain their high temperature resistance. Areas of utility are expected in automobile and aviation applications for structural, decorative and protective purposes, as high temperature electrical insulators and dielectrics for capacitors, as coil and cable wrappings, for containers and container linings, in laminating structures for application as films to various heat resistant or other types of materials, as filled compositions where the fillers may be asbestos, mica, glass fiber or the like. Other uses include binders for asbestos fibers, carbon fibers and other fibrous materials in making brakelinings and for the formulation of molding compositions using fillers such as asbestos, glass fibers, talc, quartz, wood flower, finely divided carbon and silica. Other uses are similar to those described in U.S. Pat. No. 3,983,093, the disclosure of which is incorporated herein by reference.

The crystalline polymers have particular utility where the finished article is exposed to aggressive solvents, such as methylene chloride, which often appears in degreasing solvents and cleansers. These crystalline polyimides will also be useful in the electronics industry in the production of integrated circuits. In particular, they provide effective encapsulating layers over these devices and provide insulating structures which are resilient to the organic etching solvents used to remove photoresists.

Variations of the above invention will be obvious to those skilled in the art in view of the teachings herein. These obvious variations are considered within the scope of this invention.

What is claimed is:

1. A crystalline polyimide consisting essentially of structural units of the formula

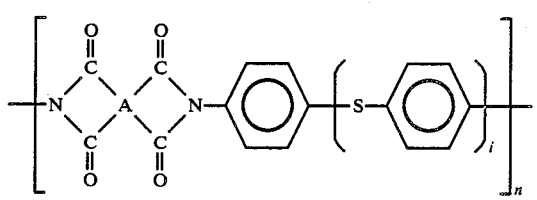

wherein A is the tetravalent aromatic nucleus of a dianhydride selected from the group consisting of pyromellitic dianhydride; biphenyl-3,3',4,4'-tetracarboxylic dianhydride; 1,4-bis(3,4-dicarboxyphenoxy)benzene dianhydride; and benzophenone-3,3',4,4'-tetracarboxylic dianhydride; i is a whole number of from 2 to 6 and n is a whole number of at least 5.

2. The polyimide polymer of claim 1 containing therein the residue of a diamine selected from the group consisting of 1,4-bis(4-aminophenylthio)benzene, 4,4'-bis(4-aminophenylthio)diphenylsulfide, 1,4-bis[4-(4-aminophenylthio)phenylthio]benzene, 4,4'-bis[4-(4-aminophenylthio)phenylthio]diphenylsulfide, and 1,4-bis[4-(4-{4-aminophenylthio}phenylthio)phenylthio]benzene.

3. A polyamic acid precursor to the polyimide polymer of claim 1 having the formula

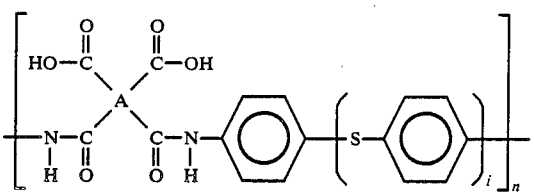

wherein A, i and n are as defined in claim 1.

4. The polyimide polymer of claim 1 wherein n is a value in the range of about 30 to about 1000.

5. The polyimide polymer of claim 1 having an equilibrium melting temperature below 375° C.

6. A crystalline polyimide consisting essentially of structural units of the formula

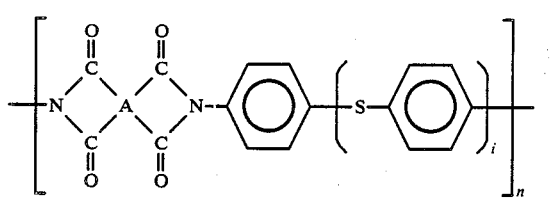

wherein A is the tetravalent aromatic nucleus of a dianhydride selected from the group consisting of pyromellitic dianhydride; biphenyl-3,3',4,4'-tetracarboxylic dianhydride; 3,3',4,4'-tetracarboxydiphenylsulfide dianhydride; 1,4-bis[3,4-dicarboxyphenoxy]benzene dianhydride; 2,2-bis[4-(3,4-dicarboxyphenoxy)phenyl]propane dianhydride; benzophenone-3,3'-4,4'-tetracarboxylic dianhydride and diphenyl ether-3,3',4,4'-tetracarboxylic dianhydride; wherein n is a whole number of at least 5; and wherein i is a whole number of from 2 to 6 for said pyromellitic dianhydride, biphenyl-3,3',4,4'-tetracarboxylic dianhydride, and benzophenone-3,3',4,4'-tetracarboxylic dianhydride; i is 2, 3, 5 or 6 for 3,3',4,4'-tetracarboxydiphenylsulfide dianhydride; and i is 2, 4, 5 or 6 for diphenyl ether-3,3',4,4'-tetracarboxylic dianhydride.

* * * * *